United States Patent
Liu

(10) Patent No.: US 9,827,995 B2
(45) Date of Patent: Nov. 28, 2017

(54) AUTOMOBILE SPEED MEASUREMENT AND CONTROL METHOD AND SYSTEM

(71) Applicant: YANCHENG INSTITUTE OF TECHNOLOGY, Yancheng, Jiangsu Province (CN)

(72) Inventor: Fuhao Liu, Yancheng (CN)

(73) Assignee: Yancheng Institute of Technology, Yancheng, Jiangsu Province (CN)

( * ) Notice: Subject to any disclaimer, the term of this patent is extended or adjusted under 35 U.S.C. 154(b) by 0 days.

(21) Appl. No.: 15/319,949

(22) PCT Filed: Jan. 12, 2016

(86) PCT No.: PCT/CN2016/070719
§ 371 (c)(1),
(2) Date: Dec. 19, 2016

(87) PCT Pub. No.: WO2016/127751
PCT Pub. Date: Aug. 18, 2016

(65) Prior Publication Data
US 2017/0120927 A1 May 4, 2017

(30) Foreign Application Priority Data
Feb. 13, 2015 (CN) .......................... 2015 1 0078663

(51) Int. Cl.
*B60W 40/105* (2012.01)
*G01P 11/00* (2006.01)
(Continued)

(52) U.S. Cl.
CPC ........ *B60W 40/105* (2013.01); *B60W 40/109* (2013.01); *B60W 50/14* (2013.01); *G01P 11/00* (2013.01); *B60W 2050/143* (2013.01)

(58) Field of Classification Search
None
See application file for complete search history.

(56) References Cited

U.S. PATENT DOCUMENTS

| 2009/0192676 A1* | 7/2009 | Sidlosky | B60T 8/1755 701/41 |
| 2011/0160963 A1* | 6/2011 | Yasui | B62D 11/003 701/41 |
| 2015/0134204 A1* | 5/2015 | Kunihiro | B62D 15/025 701/41 |

FOREIGN PATENT DOCUMENTS

| CN | 101474996 | 7/2009 |
| CN | 102692297 | 9/2012 |

(Continued)

OTHER PUBLICATIONS

International Search Report filed in PCT/CN2016/070719 dated Feb. 24, 2016.

*Primary Examiner* — Jonathan M Dager
*Assistant Examiner* — Garrett F Evans
(74) *Attorney, Agent, or Firm* — Rankin, Hill & Clark LLP

(57) ABSTRACT

By measuring speeds and deflection angles of two front wheels in real time, and according to values of gravity sensors at four wheel axles, and an axle base and a wheel base of an automobile, a center of gravity of the automobile is determined; moving speeds of the left and right front wheels of the automobile around an instantaneous center during cornering are converted into moving speeds at the center of gravity of the automobile respectively, and an average value of the two automobile speeds at the center of gravity of the automobile is taken as an actual driving speed of the vehicle during cornering; meanwhile, an automobile speed may be controlled according to force conditions of four wheels.

5 Claims, 2 Drawing Sheets

(51) Int. Cl.
*B60W 40/109* (2012.01)
*B60W 50/14* (2012.01)

(56) References Cited

FOREIGN PATENT DOCUMENTS

| | | |
|---|---|---|
| CN | 104655872 | 5/2015 |
| CN | 104764897 | 7/2015 |
| JP | 2006234505 | 9/2006 |

\* cited by examiner

AUTOMOBILE SPEED MEASUREMENT AND CONTROL METHOD AND SYSTEM

TECHNICAL FIELD

The present invention relates to the field of automobile control, and more particularly, to an automobile speed measurement and control method and system capable of effectively measuring and controlling an automobile speed of an automobile while cornering.

BACKGROUND

An automobile speed of an automobile in the prior art is mainly converted by measuring a rotational speed of a gearbox output shaft, but the rotational speed of the gearbox output shaft represents a wheel speed of the automobile. When the automobile drives in a straight line, a moving speed of the wheel of the automobile is in keeping with an entire moving speed of the automobile, while an entire moving track of the automobile is not in keeping with a track of a driving wheel of the automobile while cornering. Therefore, an error exists when the entire speed of the automobile is replaced by the wheel speed of the automobile. With continuous improvement of an intelligentized level of modern automobiles, requirements on the accuracy of each parameter of the automobile are higher. In particular, an accident is easy to occur while the automobile is cornering. Therefore, the requirements on the accuracy of the automobile speed which is a main driving index of the automobile is higher, so as to implement precise control over a driving state of the automobile during cornering. Therefore, it is an increasingly important subject about how to accurately measure the speed of the automobile during cornering and conduct effective control according to the automobile speed so as to reduce driving accidents caused by mistaken determination that is led by inaccurate automobile speed during cornering and ensure the driving safety. Chinese patent literature with a publication date of Feb. 15, 2012 and a publication number of CN102662077A discloses a vehicle speed measurement and speed-limiting alarm device, wherein the device is composed of a magnetoelectric sensor for measuring a vehicle speed, a singlechip, a vehicle speed setting module and an alarm unit; the magnetoelectric sensor and the vehicle speed setting module are respectively connected to a signal input end of the singlechip, and a signal output end of the singlechip is connected to the alarm unit. According to the vehicle speed measurement and speed-limiting alarm device disclosed by the invention, a wheel rotational speed signal is detected through the magnetoelectric sensor and inputted into the singlechip, the singlechip performs processing on the signal, calculates the vehicle speed and then displays the vehicle speed on a display device, a corresponding vehicle speed can be selected through the vehicle speed setting module in different regions, and when the actual vehicle speed exceeds a set value, a voice alarm is performed so that the driving safety can be increased. However, the solution does not consider the problem that the actual speed is not in keeping with the wheel speed of the automobile during cornering, and does not solve the problem of accurately measuring and controlling the speed of the automobile during cornering.

SUMMARY

The object of the present invention is to provide an automobile speed measurement and control method and system that may accurately measure the speed of the automobile during cornering in real time and effectively control the automobile, so as to solve the problem of easily causing driving accidents due to a reduced control precision caused by a low accuracy of the automobile speed during cornering of the automobile since a rotational speed of a gearbox output shaft is adopted in an automobile speed measurement device in the prior art for converting the automobile speed.

The technical solution adopted in the present invention to solve the technical problem above is an automobile speed measurement method, which includes the following steps of:

A. obtaining inherent parameters of a four-wheel automobile, the inherent parameters of the automobile comprising an axle base L of the automobile, and a wheel base B of the automobile; measuring and obtaining gravity values $F_1$, $F_2$, $F_3$, and $F_4$ of four gravity sensors respectively mounted on a left front wheel, a right front wheel, a right rear wheel, and a left rear wheel in real time, and measuring a deflection angle $\theta_1$ and a speed $v_1$ of the left front wheel, and a deflection angle $\theta_2$ and a speed $v_2$ of the right front wheel in real time, a distance between a centre of gravity G of the automobile and a connecting line of axes of the right front wheel and the right rear wheel being a, and a distance between the centre of gravity G and a connecting line of axes of two left front wheels being b;

B. calculating a distance a between the centre of gravity G and the connecting line of axes of the front wheel at the opposite side and the rear wheel at the opposite side, a calculation formula being:

$$a = \frac{(F_1 + F_4) \cdot B}{F_1 + F_2 + F_3 + F_4};$$

C. calculating a distance b between the centre of gravity G and the connecting line of axes of the two front wheels, a calculation formula being:

$$b = \frac{(F_3 + F_4) \cdot L}{F_1 + F_2 + F_3 + F_4};$$

D. determining the deflection angles and deflection directions of the front wheels of the automobile, the automobile speed at the centre of gravity of the automobile being determined according to the average value of the speed $v_1$ of the left front wheel and the speed $v_2$ of the right front wheel of the automobile when an average value of the deflection angles of the left and right front wheels is smaller than 2; calculating the speed at the centre of gravity of the automobile based on the left front wheel and the right front wheel respectively according to a steering state of the automobile when the average value of the deflection angles of the left and right front wheels is greater than or equal to 2;

E. calculating a speed $v_{G1}$ at the centre of gravity of the automobile based on the left front wheel:

①. calculating a distance $r_1$ between the left front wheel and an instantaneous centre O, a calculation formula being:

$$r_1 = \frac{L}{\sin(\theta_1)};$$

②. calculating an angle $\theta_G$ of the centre of gravity formed among the centre of gravity G of the automobile, the instantaneous centre O, and a shaft axis of the rear wheel, a calculation formula being:

$$\theta_G = \tan^{-1}\left(\frac{L-b}{r_1 \cdot \cos(\theta_1) + i \cdot (B-a)}\right),$$

wherein when the automobile turns left, i=1, and when the automobile turns right, i=−1.

③. calculating a distance $r_G$ between the instantaneous centre O and the centre of gravity G, a calculation formula being:

$$r_G = \frac{L-b}{\sin(\theta_G)};$$

④. calculating the speed $v_{G1}$ at the centre of gravity of the automobile, a calculation formula being:

$$v_{G1} = \frac{v_1}{r_1} \cdot r_G;$$

F. calculating a speed $v_{G2}$ at the centre of gravity of the automobile based on the right front wheel:

①. calculating a distance $r_2$ between the right front wheel and the instantaneous centre O, wherein a calculation formula being:

$$r_2 = \frac{L}{\sin(\theta_2)};$$

②. calculating an angle $\theta_G$ of the centre of gravity formed among the centre of gravity G of the automobile, the instantaneous centre O, and a shaft axis of the rear wheel, a calculation formula being:

$$\theta_G = \tan^{-1}\left(\frac{L-b}{r_2 \cdot \cos(\theta_2) - i \cdot a}\right),$$

wherein when the automobile turns left, i=1, and when the automobile turns right, i=−1.

③. calculating a distance $r_G$ between the instantaneous centre O and the centre of gravity G, a calculation formula being:

$$r_G = \frac{L-b}{\sin(\theta_G)};$$

and

④. calculating the speed $v_{G2}$ at the centre of gravity of the automobile, a calculation formula being:

$$v_{G2} = \frac{v_2}{r_2} \cdot r_G;$$

and

G. calculating an average automobile speed $v_G$ at the centre of gravity of the automobile during steering, which is:

$$v_G = \frac{v_{G1} + v_{G2}}{2}.$$

By measuring the speeds (translatory speed of the wheel relative to a road surface) and deflection angles of the two front wheels in real time through the two speed measuring devices and wheel deflection measuring devices mounted on the two front wheels of the automobile, and according to values of four gravity sensors mounted on four wheel axles of the automobile, and inherent parameters of the automobile including an axle base L (i.e., a distance between two front and rear axles of the automobile) and a wheel base B (i.e., a distance between two left and right wheels of the automobile, wherein the front and rear wheel bases are usually the same) of the automobile, the centre of gravity of the automobile is determined; and moving speeds of the left and right front wheels of the automobile around the instantaneous centre O during cornering are converted into moving speeds at the centre of gravity of the automobile respectively. A system is required to guarantee pure rolling of each wheel of the automobile during cornering, the instantaneous centre herein is the same central point surrounded by each wheel during pure rolling, but actually, central points surrounded by the left front wheel and the right front wheel of the automobile during cornering are not the same point; i.e., it is possible to have two instantaneous centres. Therefore, the left front wheel and the right front wheel are calculated separately in the present invention, and an average value of the two automobile speeds at the centre of gravity of the automobile is used as an actual driving speed of the automobile during cornering, so as to be more close to an actual condition and have higher accuracy. Compared with the method of directly converting the rotational speed of the gearbox output shaft into the automobile speed in the prior art, the automobile speed measured by the present invention during cornering has a higher accuracy, and data with a higher accuracy may be provided for modern intelligent automobiles or automatic automobiles, so as to implement more effective and effective control and ensure the driving safety. Moreover, it also has a higher accuracy to determine a traveled distance of the automobile using the automobile speed measured by the method.

According to the method of the present invention, the automobile speed is directly determined according to the average value of the speeds of the two front wheels when the average value of the deflection angles of the two front wheels of the automobile is smaller than 2, which may avoid calculation difficulty caused by oversize cornering radius of the automobile, and reduce the system cost; meanwhile, the difference between the automobile speed and the wheel speed is very small when the deflection angle of the front wheel is too small, which may not affect the measuring accuracy.

According to an automobile speed control method based on the automobile speed measurement method above, when the automobile speed is $v_G \geq 8$ m/s, a ratio K of a maximum gravity value to a minimum gravity value in the four gravity sensors is calculated, wherein K=$F_{max}/F_{min}$, and when K≥10, an automobile speed controller controls the automobile to slow down, so that the ratio K of the maximum gravity value to the minimum gravity value detected by the four gravity sensors is smaller than 5. According to the present invention, the automobile is determined whether to possibly roll over towards one side by detecting the ratio of the maximum gravity value to the minimum gravity value of the four gravity sensors, a great change in distribution of the weight of the automobile on the four wheels is a premonition that the automobile may roll over; while the automobile speed controller is connected to an automobile brake system and an engine system, and the automobile speed may be intelligently reduced through the brake system and the engine system, so that a deceleration measure can be taken in time to effectively prevent the rollover. The present invention mainly aims at the rollover of the automobile caused by relatively fast automobile speed of the automobile during cornering. Therefore, the ratio of the maximum gravity value to the minimum gravity value in the four gravity sensors is only detected when the automobile speed is larger than or equal to 8 m/s. While rollover occurring at a slow automobile speed is usually caused by too high centre of gravity of the automobile or an uneven road surface, and the effect of adopting a deceleration measure is usually not good at this moment. Preferably, when $10 > K \geq 5$ or $|v_{G1} - v_{G2}|/v_G \geq 0.1$, the automobile speed controller alarms through an alarm. Wherein, $10 > K \geq 5$ represents that the automobile trends to moving towards a certain side, and persons in the automobile are reminded to pay attention through the alarm, so that a driver may adopt a proper coping measure; while $|v_{G1} - v_{G2}|/v_G \geq 0.1$ represents that a ratio of the difference value between the two speeds of the centre of gravity of the automobile respectively calculated based the left front wheel and the right front wheel to the average value of the two speeds is larger, and the condition typically represents a mechanical failure of the automobile. Therefore, it is desirable to remind the persons in the automobile to pay attention because the difference between the two speeds of the centre of gravity of the automobile respectively calculated based on the left front wheel and the right front wheel is not big under a normal condition.

An automobile speed measurement and control system based on the automobile speed control method above includes an automobile speed controller, wheel deflection measuring instruments mounted on two front wheels of an automobile, gravity sensors mounted on four wheel axles, and wheel speed measuring instruments mounted on the two front wheels of the automobile, wherein the wheel deflection measuring instruments, the wheel speed measuring instruments and the gravity sensors are all electrically connected to the automobile speed controller.

The wheel deflection measuring instruments measure a deflection angle of the wheel and sends the deflection angle to the automobile speed controller; the wheel speed measuring instrument detects the speed of the wheel and sends the speed to the automobile speed controller; and the gravity sensor detects a gravity value of an automobile body and sends the gravity value to the automobile speed controller. A weight of an automobile body structure below the gravity sensors cannot be detected, but the weight of this part belongs to a fixed value; moreover, a and b values may either be amended, or ignored.

Preferably, the automobile speed measurement and control system further includes an alarm, wherein the alarm is connected to the automobile speed controller, the alarm includes a sound alarm and/or a light alarm, the sound alarm is mounted in a driving cab, and the light alarm is mounted on an instrument panel.

The present invention has beneficial effects that the present invention effectively solves the problem of easily causing driving accidents due to a reduced control precision caused by a low accuracy of the automobile speed during cornering of the automobile since a rotation speed of a gearbox output shaft is adopted in an automobile speed measurement device in the prior art for converting the automobile speed, and effectively controls the automobile speed, ensures the driving safety, and has a very high practical value.

in the figures: 1 refers to automobile speed controller, 2 refers to wheel deflection measuring instrument, 3 refers to gravity sensors 4 refers to wheel speed measuring instrument, and 5 refers to alarm.

DETAILED DESCRIPTION

The technical solutions of the present invention will be further described in details hereunder with reference to the embodiments and drawings.

Embodiment 1

Figure 1:
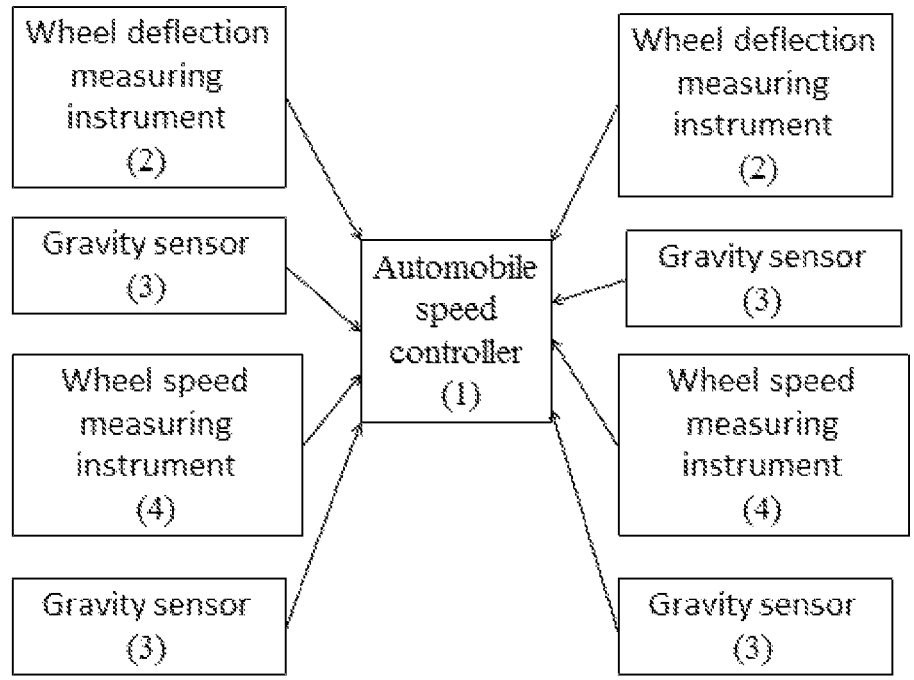
FIG. 1 is a structural block diagram of an automobile speed measurement and control system according to the present invention.

In the embodiment 1 as shown in FIG. 1, an automobile speed measurement and control system includes an automobile speed controller 1, wheel deflection measuring instruments 2 mounted on two front wheels of an automobile, gravity sensors 3 mounted on four wheel axles, and wheel speed measuring instruments 4 mounted on the two front wheels of the automobile. The wheel deflection measuring instruments are respectively mounted on the left front wheel and the right front wheel of the automobile, and are used for measuring a deflection angle $\theta_1$ of the left front wheel and a deflection angle $\theta_2$ of the right front wheel of the automobile during cornering; and the wheel speed measuring instruments are respectively mounted on the left front wheel and the right front wheel of the automobile to measure a real time speed $v_1$ of the left front wheel and a real time speed $v_2$ of the right front wheel of the automobile, and four gravity sensors are provided, which are respectively mounted on the four wheel axles to measure the gravities or pressures borne by the four wheel axles. The wheel deflection measuring instruments, the wheel speed measuring instruments and the gravity sensors are all electrically connected to the automobile speed controller. The automobile speed controller is connected to a brake system and an engine system of the automobile, and the automobile speed may be intelligently reduced through the brake system and the engine system. A value detected by the gravity sensor mounted on the wheel axle of the left front wheel is $F_1$, a value detected by the gravity sensor mounted on the wheel axle of the right front wheel is $F_2$, a value detected by the gravity sensor mounted on the right rear wheel is $F_3$, and a value detected by the gravity sensor mounted on the wheel axle of the left rear wheel is $F_4$.

An automobile speed measurement method of the automobile speed measurement and control system according to the present invention includes the following steps of:

A. obtaining inherent parameters of a four-wheel automobile, the inherent parameters of the automobile including an axle base L of the automobile, and a wheel base B of the automobile; measuring and obtaining gravity values $F_1$, $F_2$, $F_3$ and $F_4$ of four gravity sensors respectively mounted on a left front wheel, a right front wheel, a right rear wheel, and a left rear wheel in real time, and measuring a deflection angle $\theta_1$ and a speed $v_1$ of the left front wheel, and a deflection angle $\theta_2$ and a speed $v_2$ of the right front wheel in real time, a distance between a centre of gravity G of the automobile and a connecting line of axes of the right front wheel and the right rear wheel being a, and a distance between the centre of gravity G and a connecting line of axes of two left front wheels being b;

B. calculating a distance a between the centre of gravity G and the connecting line of axes of the front wheel at the opposite side and the rear wheel at the opposite side, a calculation formula being:

$$a = \frac{(F_1 + F_4) \cdot B}{F_1 + F_2 + F_3 + F_4};$$

C. calculating a distance b between the centre of gravity G and the connecting line of axes of the two front wheels, a calculation formula being:

$$b = \frac{(F_3 + F_4) \cdot L}{F_1 + F_2 + F_3 + F_4};$$

D. determining the deflection angles and deflection directions of the front wheels of the automobile, the automobile speed at the centre of gravity of the automobile being determined according to the average value of the speed $v_1$ of the left front wheel and the speed $v_2$ of the right front wheel of the automobile when an average value of the deflection angles of the left and right front wheels is smaller than 2; calculating the speed at the centre of gravity of the automobile based on the left front wheel and the right front wheel respectively according to a steering state of the automobile when the average value of the deflection angles of the left and right front wheels is greater than or equal to 2;

E. calculating a speed $v_{G1}$ at the centre of gravity of the automobile based on the left front wheel:

① calculating a distance $r_1$ between the left front wheel and an instantaneous centre O, a calculation formula being:

$$r_1 = \frac{L}{\sin(\theta_1)};$$

② calculating an angle $\theta_G$ of the centre of gravity formed among the centre of gravity G of the automobile, the instantaneous centre O, and a shaft axis of the rear wheel, a calculation formula being:

$$\theta_G = \tan^{-1}\left(\frac{L-b}{r_1 \cdot \cos(\theta_1) + i \cdot (B-a)}\right),$$

wherein when the automobile turns left, i=1, and when the automobile turns right, i=−1;

③ calculating a distance $r_G$ between the instantaneous centre O and the centre of gravity G, a calculation formula being:

$$r_G = \frac{L-b}{\sin(\theta_G)};$$

and

④ calculating the speed $v_{G1}$ at the centre of gravity of the automobile, a calculation formula being:

$$v_{G1} = \frac{v_1}{r_1} \cdot r_G;$$

F. calculating a speed $v_{G2}$ at the centre of gravity of the automobile based on the right front wheel:

① calculating a distance $r_2$ between the right front wheel and the instantaneous centre O, wherein a calculation formula being:

$$r_2 = \frac{L}{\sin(\theta_2)};$$

② calculating an angle $\theta_G$ of the centre of gravity formed among the centre of gravity G of the automobile, the instantaneous centre O, and a shaft axis of the rear wheel, a calculation formula being:

$$\theta_G = \tan^{-1}\left(\frac{L-b}{r_2 \cdot \cos(\theta_2) - i \cdot a}\right),$$

wherein when the automobile turns left, i=1, and when the automobile turns right, i=−1;

③ calculating a distance $r_G$ between the instantaneous centre O and the centre of gravity G, a calculation formula being:

$$r_G = \frac{L-b}{\sin(\theta_G)};$$

and

④ calculating the speed $v_{G2}$ at the centre of gravity of the automobile, a calculation formula being:

$$v_{G2} = \frac{v_2}{r_2} \cdot r_G;$$

and

G. calculating an average automobile speed $v_G$ at the centre of gravity of the automobile during steering, which is:

$$v_G = \frac{v_{G1} + v_{G2}}{2}.$$

According to an automobile speed control method based on the automobile speed measurement above, when the automobile speed is $v_G \geq 8$ m/s, a ratio K of a maximum gravity value to a minimum gravity value in the four gravity sensors is calculated, wherein $K = F_{max}/F_{min}$, and when $K \geq 10$, an automobile speed controller controls the automobile to slow down, so that the ratio K of the maximum gravity value to the minimum gravity value detected by the four gravity sensors is smaller than 5.

Embodiment 2

Figure 2:
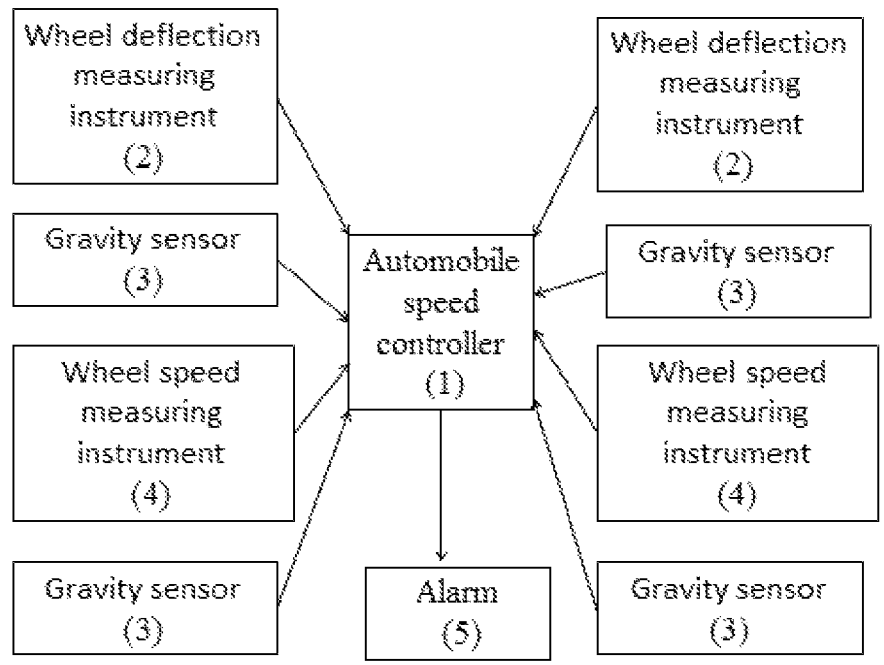
FIG. 2 is another structural block diagram of the automobile speed measurement and control system according to the present invention.
Figure 3:
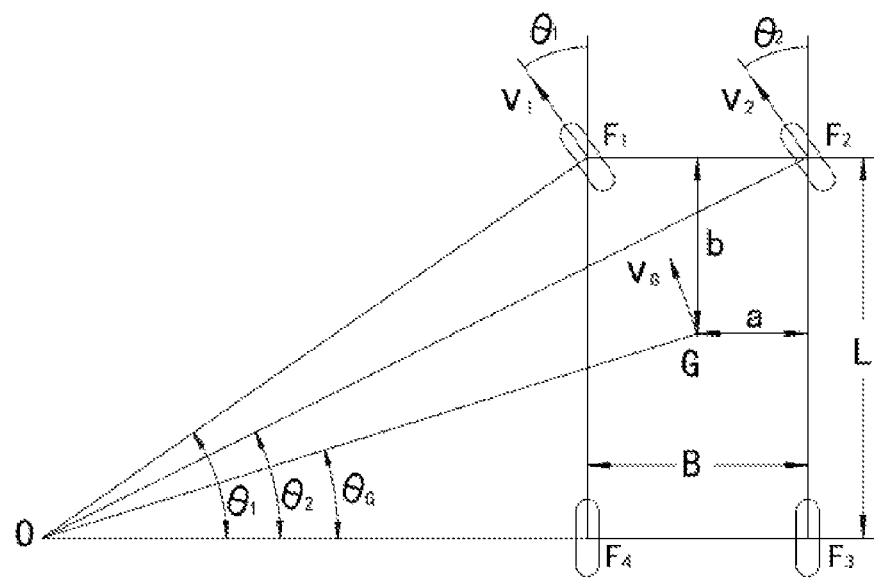
FIG. 3 is a parameter schematic diagram of the present invention when an automobile turns left.
Figure 4:
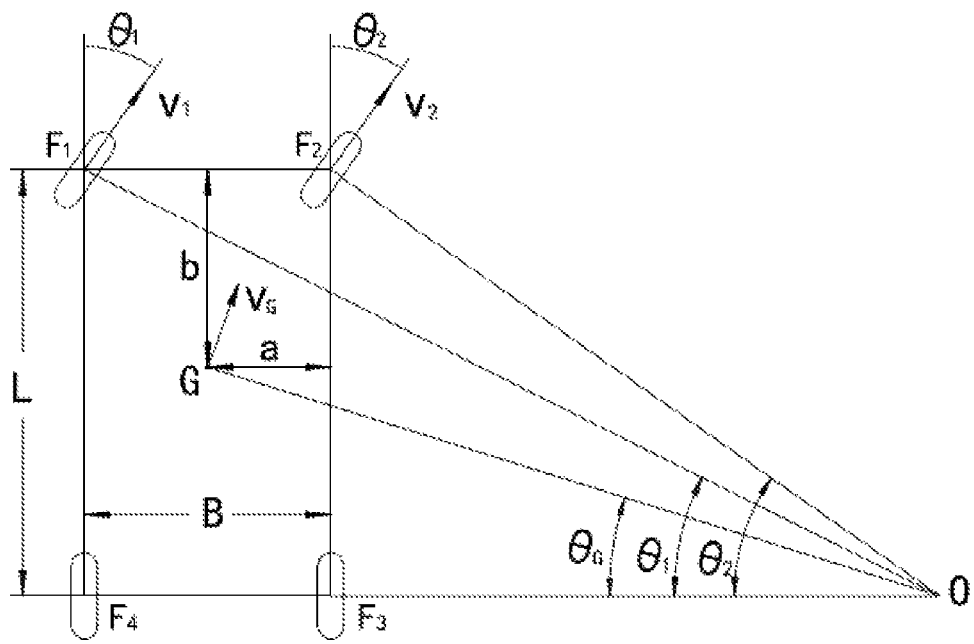
FIG. 4 is a parameter schematic diagram of the present invention when the automobile turns right.

In the embodiment 2, the automobile speed measurement and control system further includes an alarm 5 (refer to FIG. 2), wherein the alarm is connected to the automobile speed controller, the alarm includes a sound alarm and/or a light alarm, the sound alarm is mounted in a driving cab, and the light alarm is mounted on an instrument panel.

In the embodiment 2, when the automobile speed is $v_G \geq 8$ m/s, a ratio K of a maximum gravity value to a minimum gravity value in the four gravity sensors is calculated, wherein $K = F_{max}/F_{min}$, and when $10 > K \geq 5$ or $|v_{G1} - v_{G2}|/v_G \geq 0.1$, the automobile speed controller alarms through an alarm, and the following steps are the same as that in the embodiment 1.

By measuring the speeds and deflection angles of the two front wheels in real time, and according to the values of the four gravity sensors, and the axle base L and the wheel base B of the automobile, the centre of gravity G of the automobile is determined by the present invention; and the moving speeds of the left and right front wheels of the automobile around the instantaneous centre O during cornering are converted into the moving speeds at the centre of gravity of the automobile respectively. The left front wheel and the right front wheel are calculated separately in the present invention, and the average value of the two automobile speeds at the centre of gravity of the automobile is used as the actual driving speed of the automobile during cornering, so as to have a higher accuracy. Compared with the method of directly converting the rotational speed of the gearbox output shaft into the automobile speed in the prior art, the automobile speed measured by the present invention during cornering has a higher accuracy, and data with a higher accuracy may be provided for modern intelligent automobiles or automatic automobiles, so as to implement more effective and effective control and ensure the driving safety.

In addition to the embodiments above, the technical characteristics or technical data of the invention may be re-selected and re-combined within the range disclosed by the claims and the description of the invention, so as to form new embodiments. These embodiments that are not described in details in the invention may be easily implemented by those skilled in the art without going through any creative works. Therefore, these embodiments that are not described in details shall also be deemed as the specific embodiments of the invention and fall within the protection range of the invention.

The invention claimed is:

1. A computer implemented automobile speed method, comprising the following steps of:

A. obtaining inherent parameters of a four-wheel automobile, the inherent parameters of the automobile comprising an axle base L of the automobile, and a wheel base B of the automobile; measuring and obtaining gravity values $F_1$, $F_2$, $F_3$ and $F_4$ of four gravity sensors respectively mounted on a left front wheel, a right front wheel, a right rear wheel, and a left rear wheel in real time, and measuring a deflection angle $\theta_1$ and a speed $v_1$ of the left front wheel, and a deflection angle $\theta_2$ and a speed $v_2$ of the right front wheel in real time, a distance between a center of gravity G of the automobile and a connecting line of axes of the right front wheel and the right rear wheel being a, and a distance between the center of gravity G and a connecting line of axes of two left front wheels being b;

B. calculating a distance a between the center of gravity G and the connecting line of axes of the front wheel at the opposite side and the rear wheel at the opposite side, a calculation formula being:

$$a = \frac{(F_1 + F_4) \cdot B}{F_1 + F_2 + F_3 + F_4};$$

C. calculating a distance b between the center of gravity G and the connecting line of axes of the two front wheels, a calculation formula being:

$$b = \frac{(F_3 + F_4) \cdot L}{F_1 + F_2 + F_3 + F_4};$$

D. determining the deflection angles and deflection directions of the front wheels of the automobile, the automobile speed at the center of gravity of the automobile being determined according to the average value of the speed $v_1$ of the left front wheel and the speed $v_2$ of the right front wheel of the automobile when an average value of the deflection angles of the left and right front wheels is smaller than 2; calculating the speed at the center of gravity of the automobile based on the left front wheel and the right front wheel respectively according to a steering state of the automobile when the average value of the deflection angles of the left and right front wheels is greater than or equal to 2;

E. calculating a speed $v_{G1}$ at the center of gravity of the automobile based on the left front wheel:

① calculating a distance $r_1$ between the left front wheel and an instantaneous center O, a calculation formula being:

$$r_1 = \frac{L}{\sin(\theta_1)};$$

② calculating an angle $\theta_G$ of the center of gravity formed among the center of gravity G of the automobile, the instantaneous center O, and a shaft axis of the rear wheel, a calculation formula being:

$$\theta_G = \tan^{-1}\left(\frac{L-b}{r_1 \cdot \cos(\theta_1) + i \cdot (B-a)}\right),$$

wherein when the automobile turns left, i=1, and when the automobile turns right, i=−1;

③ calculating a distance $r_G$ between the instantaneous center O and the center of gravity G, a calculation formula being:

$$r_G = \frac{L-b}{\sin(\theta_G)};$$

and

④. calculating the speed $v_{G1}$ at the center of gravity of the automobile, a calculation formula being:

$$v_{G1} = \frac{v_1}{r_1} \cdot r_G;$$

F. calculating a speed $v_{G2}$ at the center of gravity of the automobile based on the right front wheel:
①. calculating a distance $r_2$ between the right front wheel and the instantaneous center O, wherein a calculation formula being:

$$r_2 = \frac{L}{\sin(\theta_2)};$$

②. calculating an angle $\theta_G$ of the center of gravity formed among the center of gravity G of the automobile, the instantaneous center O, and a shaft axis of the rear wheel, a calculation formula being:

$$\theta_G = \tan^{-1}\left(\frac{L-b}{r_2 \cdot \cos(\theta_2) - i \cdot a}\right),$$

wherein when the automobile turns left, $i=1$, and when the automobile turns right, $i=-1$;
③. calculating a distance $r_G$ between the instantaneous center O and the center of gravity G, a calculation formula being:

$$r_G = \frac{L-b}{\sin(\theta_G)};$$

and

③. calculating the speed $v_{G2}$ at the center of gravity of the automobile, a calculation formula being:

$$v_{G2} = \frac{v_2}{r_2} \cdot r_G;$$

and

G. calculating an average automobile speed $v_G$ at the center of gravity of the automobile during steering, which is:

$$v_G = \frac{v_{G1} + v_{G2}}{2}.$$

2. The automobile speed method according to claim 1, wherein when the automobile speed is $v_G \geq 8$ m/s, a ratio K of a maximum gravity value to a minimum gravity value in the four gravity sensors is calculated, wherein $K = F_{max}/F_{min}$, and when $K \geq 10$ an automobile speed controller controls the automobile to slow down, so that the ratio K of the maximum gravity value to the minimum gravity value detected by the four gravity sensors is smaller than 5.

3. The automobile speed method according to claim 2, wherein when $10 > K \geq 5$ or $|v_{G1} - v_{G2}|/v_G \geq 0.1$, the automobile speed controller alarms through an alarm.

4. An automobile speed measurement and control system, comprising an automobile speed controller, wheel deflection measuring instruments mounted on two front wheels of an automobile, gravity sensors mounted on four wheel axles, and wheel speed measuring instruments, mounted on the two front wheels of the automobile, wherein the wheel deflection measuring instruments, the wheel speed measuring instruments and the gravity sensors are all electrically connected to the automobile speed controller, the automobile speed controller configured to perform the automobile speed method according to claim 2.

5. The automobile speed measurement and control system according to claim 4, wherein the automobile speed measurement and control system further comprises an alarm, wherein the alarm is connected to the automobile speed controller, the alarm comprises a sound alarm and/or a light alarm, the sound alarm is mounted in a driving cab, and the light alarm is mounted on an instrument panel.

\* \* \* \* \*